May 19, 1964

R. F. STORY 3,134,080

HYBRID FEEDBACK AMPLIFIER

Filed Oct. 29, 1962

INVENTOR
ROGER F. STORY
BY– Smart & Biggar.
ATTORNEYS 3,134,080
Patented May 19, 1964

3,134,080

HYBRID FEEDBACK AMPLIFIER

Roger F. Story, Ottawa, Ontario, Canada, assignor to Northern Electric Company Limited, Montreal, Quebec, Canada Filed Oct. 29, 1962, Ser. No. 233,640
9 Claims. (Cl. 330—102)

This invention relates to a hybrid feedback amplifier and especially to a carrier frequency line amplifier.

In information-carrying cables, cable losses are sometimes sufficiently great that repeaters or amplifiers must be inserted at suitable intervals along the cable to compensate for the cable loss. Since communications cables usually have a standard impedance, the amplifier input and output impedances must each be matched to the line to which the amplifier is connected, in order to avoid cable reflections. Sometimes it is necessary to use an amplifier connecting one cable to a cable of a different impedance, and therefore the input and output impedances of the amplifier may, in such rare instances be different. It is, in any case desirable in cables of this type to use amplifiers which have input and output impedances which do not depend on the gain of the amplifier, but are solely a function of standard circuit parameters, so that the amplifier remains matched to the cable if the amplifier gain changes for any reason. It is further desirable to obtain accurate impedance characteristics without undue power loss. It is possible in conventional amplifiers to obtain accurate impedances with considerable power loss at both the input, and output circuits of the amplifier. However, the input power loss results in a poor noise figure for the amplifier, making it necessary to maintain a higher minimum input signal than would otherwise be necessary. Furthermore, the undue power waste in the output circuit raises the cost of transmitting the information along the cable.

It is therefore an object of the present invention to provide an amplifier of the above type having a good noise figure, accurate and readily determinable input and output impedances, the impedances being independent of amplifier gain, with little output power loss, satisfactory compensation for phase shifts within the amplifier circuit, and minimum distortion in the output circuit of the amplifier, which, according to the invention, includes a transformer.

Hybrid feedback amplifiers known in the art provide amplifying means giving a power gain between the input and output circuits of the amplifier, a first resistor responsive to the output voltage and connected in shunt with the input circuit, and a second resistor responsive to the output current and connected in series with the input circuit. It is thus seen that both voltage shunt and current series feedback are obtained, whence the term "hybrid feedback."

The amplifier according to the present invention is an improvement of such a hybrid amplifier. It is characterised by the inclusion of an output transformer and a shunt transformer which feeds the input circuit. The transformer turn ratios and the feedback resistors are chosen to satisfy condition (1) below, thereby to obtain input and output impedance values which are independent of the amplifier gain.

The invention will now be described with reference to the accompanying drawings in which.

Figure 1:
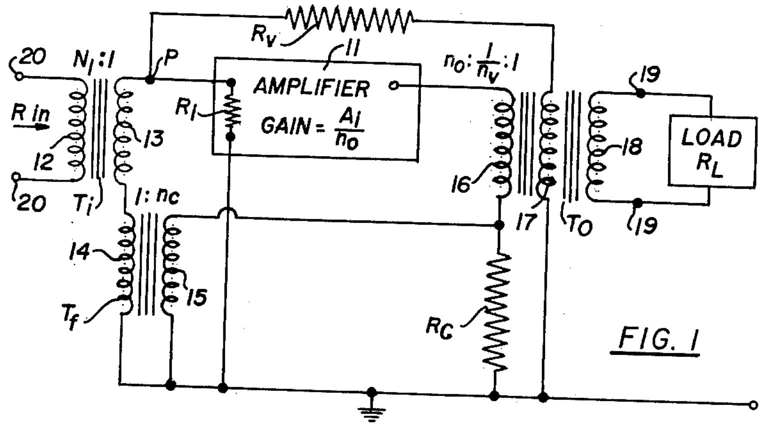
FIGURE 1 is a schematic circuit diagram of an amplifier constructed according to the present invention.

In FIGURE 1, a conventional amplifying device 11 having an input resistance $R_i$ and a current gain $$\frac{A_i}{n_o}$$

is connected to an input circuit which includes the transformer $T_i$ having a turns ratio $n_i$:1. The transformer $T_i$ has an input primary winding 12 to which an input cable or other circuit may be connected at the terminals 20. The secondary winding 13 of the transformer $T_i$ is connected to the input of the amplifying unit 11. The output of the amplifying unit 11 is connected to an output transformer $T_o$ via a primary winding 16 which is connected to ground through the current feedback resistor $R_c$. The secondary winding 18 of the transformer $T_o$ is connected to the output cable or to a suitable load $R_L$. The cable may, of course, be represented by a resistance given the reference character $R_L$ in the diagram. The output transformer may be provided with a third winding 17 which is connected to the input circuit at point P through a voltage shunt feedback resistor $R_v$. The turns ratio of windings 16, 17, and 18 is $$n_o:\frac{1}{n_v}:1$$

Additionally, a transformer $T_f$ having a turns ratio $1:n_c$ is connected between the output circuit and the input circuit, the primary winding 14 being in series with the secondary winding 13 of the transformer $T_i$ and the secondary winding 15 of the transformer $T_f$ being connected in shunt across the current series feedback resistor $R_c$.

Two feedback paths exist, one of which begins with the voltage across the winding 17 of the output transformer $T_o$, the voltage being proportional to the output voltage across the winding 18 and therefore to the output voltage across the load $R_L$. The voltage across the winding 17 creates a current which flows through the resistor $R_v$ and is fed in opposite phase to the input of the amplifying unit at point P. This type of feedback is referred to as shunt-voltage feedback and its effect is to lower both the input and the output impedance.

The second feedback path has as its source the voltage developed across the resistor $R_c$ by a current proportional to the current in the load $R_L$ and flowing through the transformer winding 16. A voltage proportional to the voltage across the resistor $R_c$ is applied in series with the input signal via the transformer $T_f$. The current series feedback thus is obtained from the transformer winding 14, in opposite phase to the current in the secondary winding 13 of the transformer $T_i$. This is termed series current feedback which, if it were the only feedback used, would tend to raise the input impedance but would not affect the output impedance.

When the shunt voltage and the series current feedback are simultaneously applied to the input of the circuit, it is necessary to carefully choose the circuit parameters in order that the two types of feedback cooperate to obtain the desired results. If the turns ratio of the primary to the secondary in transformer $T_i$ is $n_i$:1, the turns ratio in the transformer $T_f$ is $1:n_c$ and the turns ratio on the output transformer $T_o$ is $$n_o:\frac{1}{n_v}:1$$

then the following condition (1) is necessary in order to achieve the desired results:

$$\frac{R_c}{n_c^2}\ll\frac{1+\gamma A_i}{1+\beta A_i}R_i \qquad (1)$$

where $$\gamma=\frac{R_c}{R_i n_o n_c} \text{ and } \beta=\frac{R_L}{R_v n_v}$$

If the above condition is satisfied, the input and output impedances are dependent on each other and on amplifier circuit constants only, and are independent of the amplifier gain.

A number of other conditions must be satisfied for optimum circuit performance. Firstly, $\gamma A_i$ and $\beta A_i$ should be designed to be much greater than 1. These conditions would normally be satisfied by any circuit designer skilled in the electrical arts. Assuming them to be satisfied, condition (1) reduces to $$\frac{n_o}{n_c n_v}\cdot\frac{R_L}{R_v}\ll 1$$

For optimum output power efficiency the following conditions are necessary:

The terms $$\frac{R_L}{n_v 2R_v} \text{ and } \frac{R_c}{n_o 2R_L}$$

should be small compared to 1.

The turns ratio of the output transformer is limited to the extent that the output transistor or tube driving it must see a load resistance that is much smaller than the transistor or tube output impedance. The turns ratio of the feedback transformer $T_f$ is limited since the impedance $R_c$ transformed into the input circuit must be small with respect to the impedance due to the feedback. This is implicit in condition (1). In practice, it is found that the turns ratio of the transformer $T_f$ must be relatively large.

Finally, to make the design formulae simple and to prevent absorption of input power by the resistor $R_v$, $R_v$ should be much larger than all other resistances in the path consisting of the winding 17, $R_v$ and the parallel paths between the point P and ground. Satisfaction of this condition assists in the satisfaction of condition (1).

Assuming that the above conditions are satisfied in the amplifier, and that the output impedance is matched to the load, the following values for the input and output impedances $R_{in}$ and $R_{out}$, and the current gain A from input to output with feedback are given by:

$$R_{in}=\frac{n_i 2n_v}{n_o n_c}\cdot\frac{R_c R_v}{R_L}$$

$$R_{out}=\frac{n_i 2n_v}{n_o n_c}\cdot\frac{R_c R_v}{R_g}$$

where $R_g$ is the impedance facing the input circuit (i.e., the generator impedance or input line impedance) and $$A=\frac{n_i n_v R_v}{R_L}$$

If the input and output impedances are matched ($R_{in}=R_g$, $R_{out}=R_L$) then $$R_{in}=\frac{n_i 2n_v}{n_o n_c}\cdot\frac{R_c R_v}{R_L}$$

If the input and output impedances are matched and equal, $$R_{in}=R_g=R_{out}=R_L=\sqrt{\frac{n_i 2n_v}{n_o n_c}}\sqrt{R_v R_c}$$

The amplifier construction according to the above design makes possible relatively large output power efficiency. Assuming that $R_o=R_L$, which is the condition for maximum power transfer, it may be shown that the ratio of the power $P_L$ delivered to the load, to the power $P_o$ delivered by the output transformer, is given by the following relation:

$$\frac{P_L}{P_o}=\frac{1}{\frac{1}{1+\frac{R_L}{n_v 2R_v}}+\frac{R_c}{n_o 2R_L}} \qquad (2)$$

If the terms $$\frac{R_L}{n_v 2R_v}$$

and the ratio $$\frac{R_c}{n_o 2R_L}$$

are made much smaller than 1, in which case the above expression (2) approximates unity, the power efficiency is maximum. In actual practice, about 5% or less of the power is lost in embodiments of the amplifier actually constructed.

Figure 2:
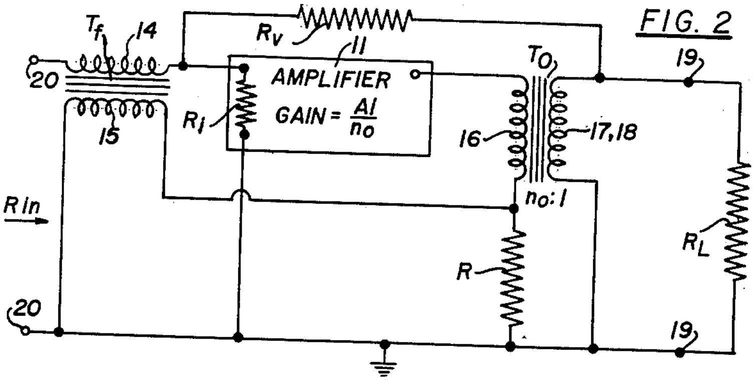
FIGURE 2 is an alternative embodiment of an amplifier according to the invention, having a different type of output transformer and having no input transformer.

FIGURE 2 shows an alternative embodiment of the circuit according to the present invention. The input transformer $T_i$ has been omitted, the input being applied directly across the terminals 20, and the feedback transformer $T_f$ being directly in series with the input of the amplifying unit. Additionally, the winding 17 has been incorporated with the winding 18 as a single winding in the output transformer $T_o$. Accordingly, the terms $n_i$ and $$\frac{1}{n_v}$$

as used in FIGURE 1, are unity if the circuit according to FIGURE 2 is used. Note that the transformer winding 18 must be grounded in the circuit of FIGURE 2.

Figure 3:
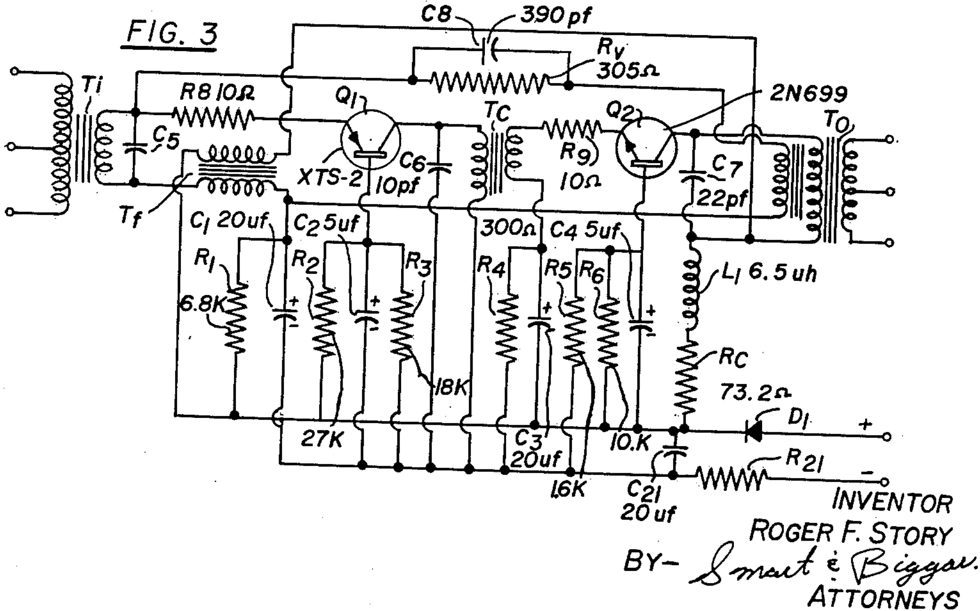
FIGURE 3 is a detailed circuit diagram showing the circuit components of an embodiment of the amplifier according to the invention.

FIGURE 3 is a detailed circuit diagram showing components of the feedback circuits and the internal circuitry of the amplifier 11. It is immaterial how many amplifying stages are used in the amplifier unit 11; two stages are shown in FIGURE 3 for purposes of illustration. The amplifier includes transistors Q1, Q2, coupling condensers and resistors C6, C7, R8 and R9, all of which are conventional circuit components connected in standard fashion. The coupling transformer $T_c$ is also a standard unit. The transistors are biased from the D.C. supply line through resistors R1, R2, R3, R4, R5 and R6 via a diode D1 and a conventional resistance-capacitance filter composed of the elements R21 and C21 connected to the power supply. Decoupling condensers C1, C2, C3 and C4 perform the usual decoupling function in amplifiers of this type. The entire amplifier circuit might be replaced by any "black box" having an input impedance $R_i$, a current gain $$\frac{A_i}{n_o}$$

and an infinite output impedance. The capacitors C8 and C5 and the inductor L1 are frequency-compensating components and are not necessary to explain the operation of the feedback circuits. The resistors R8, R9 are used to stabilize the input impedance of the transistors in practice, using standard transistors, these resistors would not be necessary. The other circuit elements shown are identified in the drawing with the same reference numerals as used in FIGURES 1 and 2. The operation of the circuit is exactly as described with reference to FIGURE 1. The circuit of FIGURE 3 is useful for frequencies in the range 15–500 kc.

The output transformer $T_o$ must be capable of handling the desired load power. This means that in most practical applications of the present invention, a large transformer with an unfavourable phase gain characteristic in the voltage shunt feedback path must be used. The hybrid amplifier according to the invention inherently compensates for this characteristic because the current series feedback path is designed to provide a phase gain correction for the voltage shunt feedback path. Because the current series feedback path is not affected by stray capacities in the output circuit, provided $R_c$ is of sufficiently low impedance and ordinary design care is used, this path retains its effect in all modes of operation of the circuit. Since there is a very low power transfer in the transformer $T_f$, this transformer may be manufactured in a small size with a low impedance. This results in the possibility of a controlled phase-shift for the current feedback path over the range 1 kilocycle to 5 megacycles for the design shown in FIGURE 3. In other words the phase shift contribution of the transformer $T_f$ to the current series feedback path may be made negligible over the frequency range of the amplifier. Thus, even if there is some excessive phase shift in the voltage shunt feedback path at high frequencies, the current series feedback, which predominates at high frequencies, prevents the voltage path phase shift from causing oscillations in the amplifier to take place.

In practice it is found that communications cables do not have a constant impedance in all conditions. For example, changes in temperature result in changes in the cable impedance. Accordingly, resistance "pods" may be placed at the input of the amplifier according to the invention in order to adjust the amplifier input impedance to the prevailing line impedance. This adversely affects the noise figure of the circuit, but if the amplifiers are spaced at relatively short intervals along the line, the adverse effect will be negligible.

There is a disadvantage associated with the circuit according to the invention in that the input and output impedances depend on the load and generator impedances respectively. However, the generator impedance and the load impedance are generally matched in the input and output in practical applications of the circuit and therefore this disadvantage is not a serious one in practice.

What I claim as my invention is:

1. An amplifier comprising an input circuit; amplifying means connected to the input circuit and adapted to amplify a signal present in the input circuit; an output transformer having a primary winding, an output winding adapted to be connected to a load and a feedback winding, the primary winding being connected to the amplifying means and being adapted to receive the amplified signal from the amplifying means; a first resistor connected to the primary winding of the output transformer; a feedback transformer having a primary winding connected in series with the input circuit and a secondary winding connected in parallel with the first resistor thereby to provide a negative current series feedback path; and a second resistor connected between the feedback winding of the output transformer and the input circuit thereby to provide a negative voltage shunt feedback path; wherein $$\frac{R_c}{n_c2} \text{ is much less than } \frac{1+\gamma A_i}{1+\beta A_i}R_i$$

where $R_c$ is the resistance of the first resistor, $n_c$ is the ratio of the number of turns on the secondary winding to the number of turns on the primary winding of the feedback transformer, $$\gamma=\frac{R_c}{R_i n_o n_c},$$

$$\beta=\frac{R_L}{R_v n_v}$$

$R_i$ is the input resistance of the amplifying means, $R_v$ is the resistance of the second resistor, $R_L$ is the resistance of the load, $n_o$ is the ratio of the number of turns of the primary winding to the number of turns on the output winding of the output transformer, $$\frac{1}{n_v}$$

is the ratio of the number of turns of the feedback winding to the number of turns on the output winding of the output transformer, and $$\frac{A_i}{n_o}$$

is the current gain of the amplifying means.

2. An amplifier as defined in claim 1, wherein the output winding and the feedback winding of the output transformer are one and the same winding.

3. An amplifier as defined in claim 1, wherein the terms $\gamma A_i$ and $\beta A_i$ are each much larger than 1.

4. An amplifier comprising an input transformer having a primary winding and a secondary winding; amplifying means connected to the secondary winding of the input transformer and adapted to amplify the signal present in the said secondary winding; an output transformer having a primary winding connected to the output of the amplifying means and adapted to receive the amplified signal produced by the amplifying means, an output winding adapted to be connected to a load, and a feedback winding; a first resistor connected between the fedback winding and the said secondary winding thereby to provide a negative shunt voltage fedback path; a feedback transformer having a primary winding connected in series with said secondary winding and a secondary winding; and a second resistor connected in parallel with the secondary winding of the feedback transformer and to the primary winding of the output transformer thereby to provide a negative current series feedback path.

5. An amplifier as defined in claim 4, wherein the circuit parameters are chosen to make the input and output impedances of the amplifier independent of the parameters of the amplifying means.

6. An amplifier as defined in claim 4, wherein $$\frac{R_c}{n_c2} \text{ is much less than } \frac{1+\gamma A_i}{1+\beta A_i}R_i$$

where $R_v$ is the resistance of the first resistor, $n_c$ is the ratio of the number of turns on the secondary winding to the number of turns on the primary winding of the feedback transformer, $$\gamma=\frac{R_c}{R_i n_o n_c},$$

$$\beta=\frac{R_L}{R_v n_v},$$

$R_i$ is the input resistance of the amplifying means, $R_c$ is the resistance of the second resistor, $R_L$ is the resistance of the load, $n_o$ is the ratio of the number of turns of the primary winding to the number of turns on the output winding of the output transformer, $$\frac{1}{n_v}$$

is the ratio of the number of turns of the feedback winding to the number of turns on the output winding of the output transformer, and $$\frac{A_i}{n_o}$$

is the current gain of the amplifying means.

7. An amplifier as defined in claim 6, wherein the output winding and the feedback winding of the output transformer are one and the same winding.

8. An amplifier as defined in claim 6, wherein the terms $\gamma A_i$ and $\beta A_i$ are each much larger than 1.

9. An amplifier as defined in claim 8, wherein the terms $$\frac{R_L}{n_v2R_v}$$

and $$\frac{R_c}{n_o2R_L}$$

are each much smaller than 1.

No references cited.